Aug. 12, 1924.
W. E. CURTIS
AUTOMATIC COOKING DEVICE
Filed Feb. 23, 1917   3 Sheets-Sheet 1
1,504,546
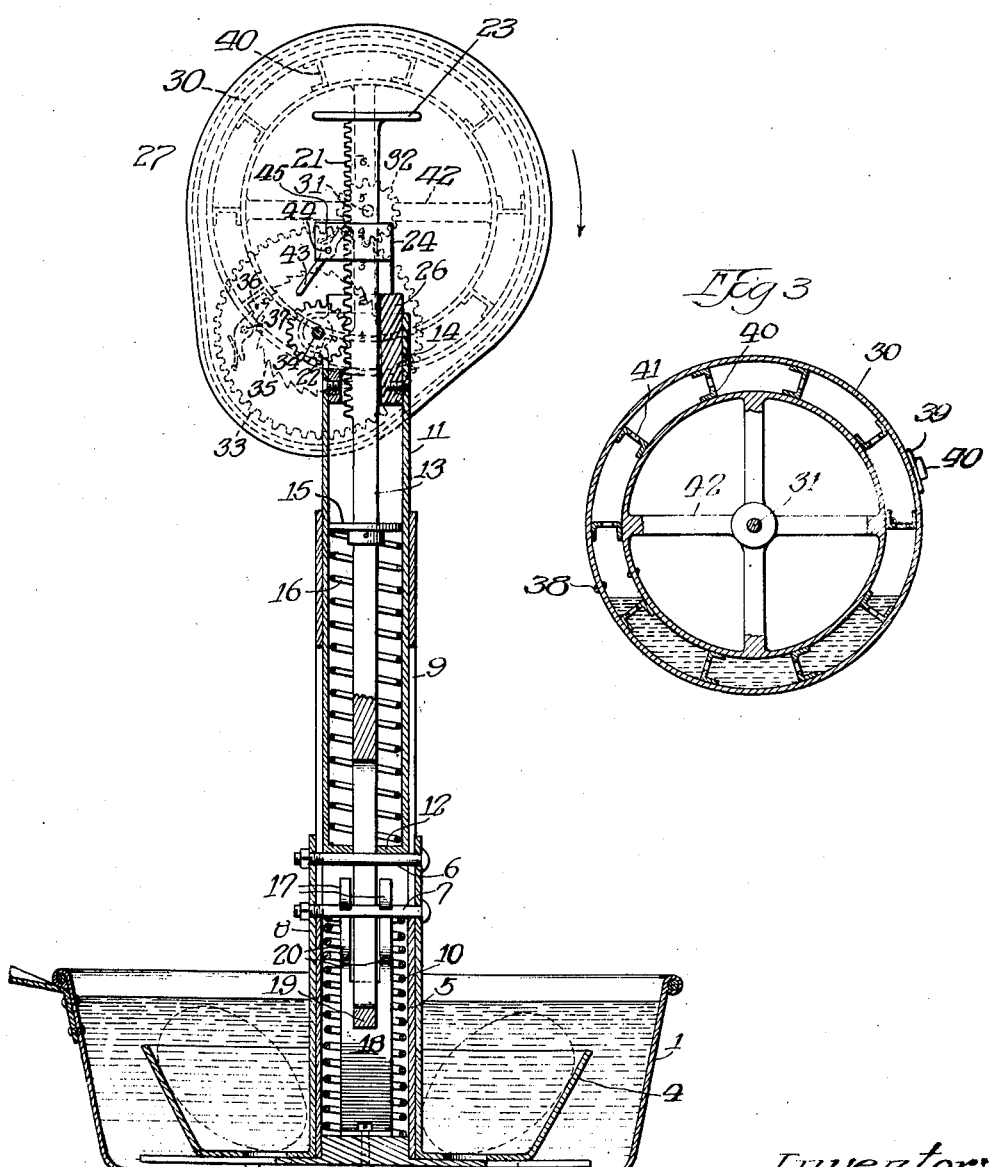

Aug. 12, 1924.
W. E. CURTIS
1,504,546
AUTOMATIC COOKING DEVICE
Filed Feb. 23, 1917   3 Sheets-Sheet 2
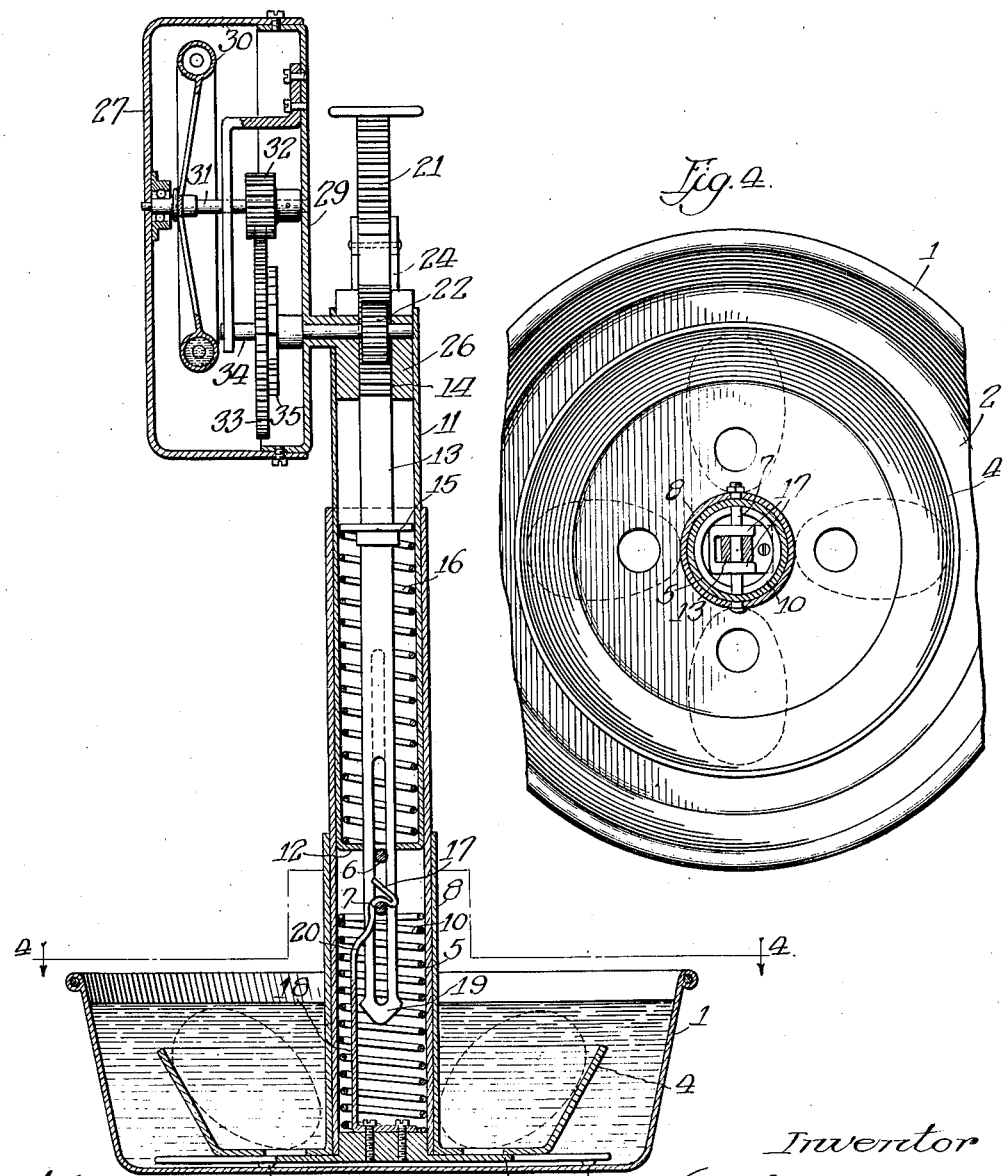

Aug. 12, 1924.
W. E. CURTIS
AUTOMATIC COOKING DEVICE
Filed Feb. 23, 1917   3 Sheets-Sheet 3
1,504,546
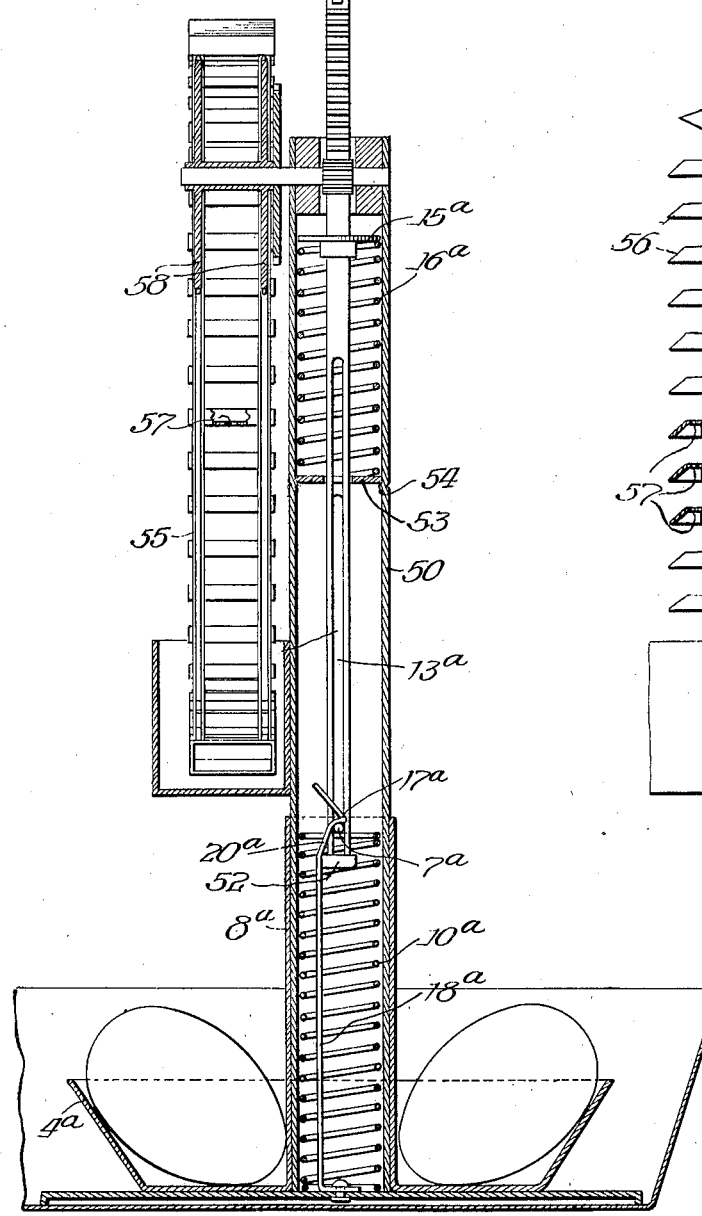
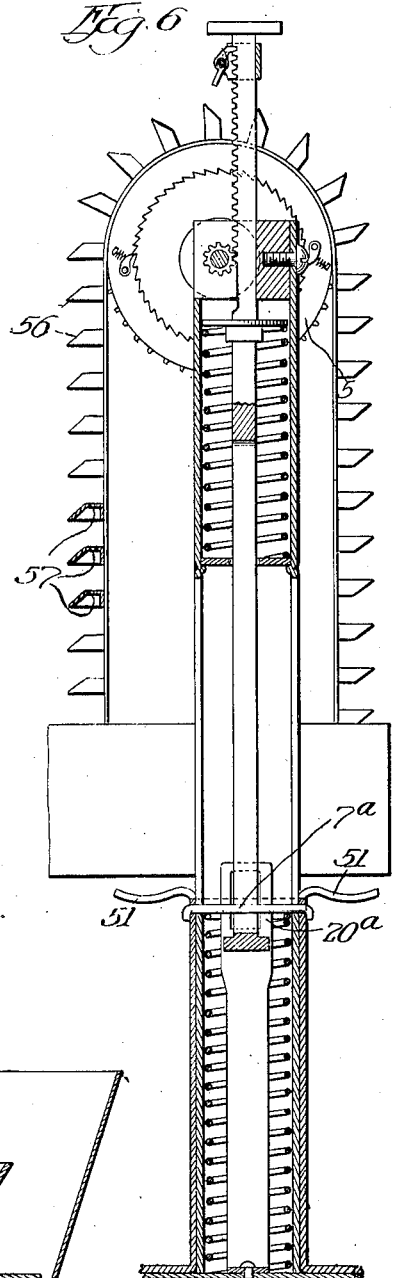

Patented Aug. 12, 1924.

1,504,546

UNITED STATES PATENT OFFICE.

WILL ESPY CURTIS, OF EVANSTON, ILLINOIS.

AUTOMATIC COOKING DEVICE.

Application filed February 23, 1917. Serial No. 150,470.

*To all whom it may concern:*

Be it known that I, WILL ESPY CURTIS, a citizen of the United States, and a resident of Evanston, in the county of Cook and State of Illinois, have invented certain new and useful Improvements in Automatic Cooking Devices, of which the following is a specification.

My invention relates to a device for automatically regulating the length of time during which an object or substance is subjected to treatment—such, for example, as exposure to heat, chemical solutions or vapors, etc.—its object being to provide an apparatus and mechanism by which, for example, an object or substance being immersed, for instance, in a heated liquid is at an appointed time withdrawn from the same without further attention on the part of the operator.

It consists also in an extension of the constructive principle involved to an apparatus adapted to receive and care for in like manner any number of objects or substances with certainty of action and entire independence each of the other.

The applications of the invention in the arts are quite numerous and important—for example, the immersion of textile and other fabrics in dyeing solutions, subjection of products to chemical action of vapors or liquid solutions, treatment of food products such as eggs, fruit, and starchy substances, by boiling water, printing of photographs from negatives, and various other cases where the time of immersion or treatment or the beginning or termination of a given condition is important to be observed.

In the present illustrations of my invention I have selected its application to culinary purposes, and exhibit in the drawings an apparatus designed more particularly for use in connection with the boiling of eggs, for the use of hotels, hospitals, private dwellings, etc.

The principal objects of my present invention are to provide improved means for regulating chronometrically the treatment of substances; to provide an improved chronometric regulating device; to provide improved means for controlling the continuous movement of an element; the provision of improved means for lowering and raising material from a treating bath, and the provision of improved means for allowing a member to move freely in one direction, and at a predetermined limited rate of speed in the opposite direction.

In attaining these and other objects and advantages to be hereinafter set forth, I have provided a construction two embodiments of which are illustrated in the accompanying drawings, in which:

Figure 1 is a front view in section of an egg boiler constructed in accordance with my present invention;

Figure 2 is a side view of the same in section;

Figure 3 is a section through the speed governing wheel;

Figure 4 is a section on the line 4—4 of Figure 2, looking in the direction of the arrows;

Figure 5 is a side view of a modified form of egg boiler constructed in accordance with my present invention; and Figure 6 is a front view of the egg boiler shown in Figure 5.

In the drawings two forms of construction are shown, one in which the egg container is depressed and the timing mechanism is set by a single operation and the other, a somewhat simpler form in which the egg container is depressed by a separate operation from that which sets the timing mechanism. The first of these forms will be described first.

The apparatus illustrated in Figures 1 to 4 is arranged to stand in a saucepan or the like 1 and for this purpose is provided with a spider 2, the three arms of which are provided with feet 3 arranged to rest on the bottom of the saucepan. As shown in the drawings, the apparatus is shown in the position the parts assume just after the egg container has been depressed and the timing mechanism set. The eggs are carried in an annular container 4 arranged to slide up and down on a tube 5. Two pins 6 and 7 are attached to the cylindrical part 8 of the container 4. These pins pass through slots 9 in the tube 5 which allow the container 4 to be moved downwardly into the water in the saucepan, and upwardly again at the desired time. Within the tube 5 is arranged a helical spring 10 preferably of brass, or other material which will not rust or corrode by contact with water. The spring 10 will normally tend to hold the container 4 in its uppermost position. Sliding within the upper part of the tube 5 is a tube 11, the lower end 12 of which is arranged to contact with the upper pin 6 attached to the egg container 4 so that by downward movement thereof the egg container is depressed as shown in Figure 1.

Inside of these two tubes is arranged a plunger 13, preferably of rectangular cross-section, arranged to pass through a complementarily shaped aperture 14 in the upper part of the tube 11. This plunger is provided with a projecting portion 15 adapted to contact with and compress the spring 16 arranged within the tube 11 when the plunger is depressed. By pressing the member 13 downward as far as permitted by the block 24, with consequent compression of the spring 16 the tube 11 may be caused to descend, thereby depressing the egg container 4 by reason of the engagement of the lower end of the tube 11 with the pin 6. As a result of the depression of the egg container 4 the pin 7 is brought under the hooked portions 17 of a bifurcated spring latch 18 (as shown in Figure 2) so that the container 4 will be held in its depressed position until the latch 18 is released from engagement with the pin 7. The bifurcated ends 17 of the latch 18 are spaced apart sufficiently to allow the body of the plunger 13 to pass therebetween. When the latch 18 has been moved out of engagement with the pin 7 the egg container is moved upwardly by means of the spring 10. This latch is released by the plunger 13 at a given interval after the egg container has been depressed. For this purpose the plunger is provided with an enlarged bevelled end 19 (see Figure 1) adapted to engage the shoulders 20 on the two bifurcated end portions 17 of the latch 18 and push them to one side and thereby move the parts 17 out of engagement with the pin 7, whereupon the spring 10 is free to move the egg container upwardly. The enlarged end portion 19 is bevelled in one direction (see Figure 2) in order that it may push the ends 17 of the latch 18 aside on its downward movement, after which the parts 17 spring back into position to engage the pin 7. The action of the device depends upon the fact that the time required for the plunger to move upwardly under the action of the spring 16 is chronometrically controlled so that the release of the pin 7 from the catch 17 by means of the plunger will take place at a predetermined interval after the plunger has been depressed.

For controlling the rate of upward movement of the plunger it is provided with teeth 21 for a part of its length. These teeth 21 are adapted to engage with a pinion 22. This pinion 22 is connected to a speed governor device, to be hereafter described, which will allow the pinion 22 to rotate clockwise (as viewed in Figure 1) without substantial restriction. This governor, however, prevents rotation of the pinion 22 in contra-clockwise direction at more than a predetermined rate of speed. If, therefore, the plunger 13 is depressed manually by pressure on its knob 23 to its lowest extent, the teeth 21 will rotate the pinion 22 rapidly in a clockwise direction. After the hand has been taken off the knob 23, the plunger will move very slowly upwardly under the action of the spring 16 and thereby rotate the pinion 22 in contra-clockwise direction. Until the toothed portion of the plunger has passed the pinion 22 (when the plunger will move rapidly upwards under the action of its spring, thereby tripping the latch 18 and allowing the egg container to move upwardly) the speed of rotation of the pinion 22 is controlled, and the time for one revolution, or a given part of a revolution thereof, is, therefore, substantially fixed. In order, therefore, to vary the time of tripping the number of teeth 21 brought into engagement with the pinion 22 is varied. For this purpose an adjustable member 24 is arranged at the upper end of the plunger 13, the position of which may be varied by means of the thumb latch 43. The rear portion of this member 24 engages the plug 26 mounted within the tube 11, and consequently limits the distance the plunger 13 can be depressed in tube 11. This plunger is graduated in fractions of minutes so that the device may be set so that the plunger trips the latch 18 at any desired length of time after it has been depressed. The thumb latch 43 is pivotally mounted at 44 on the member 24, and provided with a spring 45 adapted to hold the latch 43 in engagement with one or other of the teeth 21.

The governing device is mounted in a case 27 attached to a base 29. The base 29 is integrally connected to the plug 26 which is mounted in the upper end of the tube 11. The governor consists of a wheel 30, on a shaft 31 having mounted thereon, and preferably formed integrally therewith, a pinion 32 adapted to mesh with a toothed wheel 33 revolubly mounted on the shaft 34. The pinion 22 which engages the rack on the plunger is non-rotatably mounted on the same shaft 34. Operative connection between the toothed wheel 33 and the shaft 34 is made by means of ratchet wheel 35 non-rotatably mounted on the shaft 34 and pawl 36. The pawl 36 is pivotally mounted at 37 on the toothed wheel 33. With this arrangement the pinion 22 is free to rotate in a clockwise direction without rotating the governing wheel 30, but when rotated in the opposite direction turns the wheel 30. I have provided a pawl and ratchet connection between the pinion 22 and the governing wheel 30 instead of providing ratchet teeth on the pinion 22 and the plunger 13 as it greatly decreases the wear and tear on the parts. If the plunger 13 and pinion 22 were provided with ratchet teeth, a spring might be required to hold the parts in contact, and on the downward movement of the plunger there would be excessive wear as the teeth thereon slipped over the teeth of the pinion while being pressed together by means of the spring.
The construction of the governing wheel 30 is shown more particularly in Figure 3. It consists of a tube bent round into circular form with its ends welded or otherwise secured together at 38. The tube wheel 30 is supported by spokes 42 which are preferably dished, as shown in Figure 2, to provide means for adjusting the wheel tube relatively to its shaft 31 by bending one or more spokes into a position more nearly perpendicular than that of the other spokes. Provision for such adjustment is desirable since accurate chronometric regulation depends on the careful centering and balancing of the wheel 30. Diametrically opposite (to balance the weight of the welded portion) to the point of weld is placed a patch 39 in order to provide sufficient thickness for the threads of a filling plug 40. For less accurate service this patch and plug may be entirely omitted in which case the tube is filled with the requisite amount of liquid or finely divided solid prior to welding. Inside this tube are arranged diaphragms 40 with apertures 41. Preferably, though not necessarily, these diaphragms are arranged at equal distances apart.

The tube is partially filled with a liquid, preferably mercury, or a finely divided solid, such as sand. The purpose of this liquid or finely divided solid is to check the rotation of the wheel. I prefer to fill the tube about one-third full of mercury which rests at the bottom of the wheel when the latter is at rest. The rotation of the wheel 30 in the direction of the arrow produces a change in the position of the mercury owing to the fact that the mercury cannot flow sufficiently rapidly through the orifices 41 in the diaphragms 40 to keep the level of the liquid on the two sides of the devices substantially equal. Consequently, the level of the mercury on the left side of the wheel becomes higher than the other until the head of mercury is sufficient to cause the mercury to flow through the tube at the same rate, but in the opposite direction to the rotation of the wheel. Evidently the force required to rotate the wheel will increase with the height to which the mercury is drawn up on one side of the wheel by the rotation of the wheel. There will be a position of equilibrium between the driving force and the resistance to movement offered by the mercury corresponding to a certain speed.

In Figures 5 and 6 I have shown a simpler form of construction in which, instead of employing two tubes arranged to telescope together, a single tube 50 is employed for carrying the necessary springs and other parts for operating the apparatus. The egg container 4ª is provided with a cylindrical part 8ª adapted to slide up and down on the tube 50. At the upper end of the part 8ª laterally projecting finger holds 51 are arranged to enable the egg container 4ª to be manually depressed in order to bring the pin 7ª beneath the portions 17ª of the latch 18ª.

The plunger 13ª acts in similar manner to the plunger 13 of Figures 1 and 2, although the lower end of the plunger never rises above the parts 17ª of the latch 18ª. The plunger rises far enough to trip the latch by means of the enlarged end 52 on the end of the plunger which engages the portions 20ª of the latch. The spring 10ª is provided for raising the egg container from the water as soon as the plunger has moved the latch 18ª out of engagement with the pin 7ª. The release of the egg container is similar to that of the egg container 4 of Figures 1 and 2, but instead of being depressed automatically by downward movement of the plunger the egg container has to be depressed by a separate operation, namely, pressure of the fingers on the finger holds 51.

The plunger is moved upwardly by means of the spring 16ª which bears at its lower end against the washer 53 held in place by an inwardly projecting shoulder 54 in the tube 50. A collar 15ª or similar device on the plunger provides the necessary support for the upper end of the spring 16ª. The timing mechanism is similar to that of Figures 1 to 4, except that instead of providing gearing between the shaft which carries the pinion which is in mesh with the rack on the plunger, and the shaft which carries the governing wheel, the governing wheel is mounted directly on the same shaft as the pinion just referred to. Pawl and ratchet connection is provided as shown.

In Figure 6 a modified form of governing device is shown in which an endless chain 55 having a series of buckets 56 mounted thereon, is used. These buckets are provided with small apertures 57 in their lower portions so as to allow of the slow escape of liquid or finely divided solid from the buckets. The chain is arranged to dip under the surface of a liquid, such as mercury, or a heap of sand or the like. The chain is arranged to pass around a sprocket wheel 58 which may be mounted on the same shaft which carries the pinion which meshes with the rack on the plunger.

The principle involved in the foregoing forms of governor may be applied to speed regulation in a number of ways as in one aspect it consists broadly in causing fluid to be moved at a velocity proportional to the velocity of a moving element and interposing a restriction in the path of the fluid so that the resistance to movement of the fluid increases with the velocity of the element and at a given predetermined speed equals the force applied to that element to give it movement. In another aspect this principle consists broadly in providing a weight movable relatively to a member rotated from a source of power and having its center of gravity at a distance from the axis of rotation of the member, and having frictional engagement with the latter so that the higher the speed the member is rotated the greater the displacement of the center of gravity of the weight with the result that a position of equilibrium is obtained at a predetermined speed.

Having thus described my invention and illustrated its use, what I claim as new and desire to secure by Letters Patent is:

1. A chronometric regulating device comprising, in combination, a source of power, a member consisting of a tube bent into endless form with its ends welded together, means for introducing liquid into said member arranged substantially diametrically opposite to said welded connection, a series of restrictions within said member adapted to check the flow of fluid through said member under the action of gravity when the member is rotated, whereby the rotation of said member is checked with a force increasing with its speed of rotation, and substantially constant speed of rotation is obtained.

2. In an apparatus for regulating chronometrically the treatment of substances, a member adapted to hold the material to be treated, a plunger for moving said member in one direction, a latch for holding said member after movement by said plunger adapted to be released by movement of the plunger in the opposite direction, and means for controlling the rate of movement of said plunger in said last-mentioned direction.

3. In an apparatus for regulating chronometrically the treatment of substances, a member adapted to hold the material to be treated, a plunger for moving said member in one direction, a spring for moving said member in the opposite direction, a latch for holding said member after movement by said plunger adapted to be released by movement of the plunger in the opposite direction, and means for controlling the rate of movement of said plunger in said last-mentioned direction.

4. In an apparatus for regulating chronometrically the treatment of substances, a member adapted to contain the material to be treated, means for moving said member in one direction, holding means for maintaining said containing member at a predetermined position adapted to be released by movement of said moving means in another direction, and means for controlling the rate of movement of said moving means in said last-mentioned direction.

5. In an apparatus for regulating chronometrically the treatment of substances, a member adapted to contain the material to be treated, means for moving said member in one direction, a yielding resistance for moving said container in the opposite direction, holding means for maintaining said containing member at a predetermined position adapted to be released by movement of said moving means in another direction, and means for controlling the rate of movement of said moving means in said last-mentioned direction.

6. A chronometric regulating device comprising in combination a source of power, a member consisting of a tube bent into endless form with its ends welded together, a plug for introducing liquid into said member arranged substantially diametrically opposite to said welded connection, a series of restrictions within said member adapted to check the flow of fluid through said member under the action of gravity when the member is moved, whereby the movement of said member is checked with a force increasing with its speed of movement and substantially constant rate of movement is obtained.

7. In an apparatus for regulating chronometrically the treatment of substances, a member adapted to hold the material to be treated, manual means for moving said member in one direction, resilient means for moving said member in the opposite direction, a member adapted to be moved manually freely in one direction, resilient means for moving said last-mentioned member in the opposite direction, said last-mentioned member having its rate of movement by said resilient means controlled chronometrically, said members being adapted for movement relatively to their said resilient means independently of each other.

8. In an apparatus for regulating chronometrically the treatment of substances, a tube, two springs within the tube, a member adapted to hold the material to be treated, manually operated means for moving said member in one direction, and a connection to one of said springs whereby said member is moved in the opposite direction, releasable means for preventing said spring operating on said member, a second member for releasing said first member, manual means for moving said member in one direction, a connection to said second spring whereby said last-mentioned member is moved in the opposite direction, and means for controlling said last-mentioned movement chronometrically.

9. In an apparatus for regulating chronometrically the treatment of substances, a member adapted to hold the material to be treated, a plunger for moving said member in one direction, a latch for holding said member after movement by said plunger in the opposite direction, a spring for moving said plunger in said last mentioned direction and means for controlling the rate of movement of said plunger by said spring.

10. In an apparatus for regulating chronometrically the treatment of substances, a member adapted to hold the material to be treated, a plunger adapted to move substantially freely in one direction and at a controlled rate of speed in the opposite direction, movement of said plunger in the first direction moving said member into operative position, movement of the plunger in the second direction causing said member to move in the opposite direction.

In testimony whereof I have hereunto signed my name in the presence of the two subscribing witnesses.

WILL ESPY CURTIS.

Witnesses:
RIDSDALE ELLIS,
WILLIAM GOLDBERGER.